(12) United States Patent
Araki et al.

(10) Patent No.: US 8,597,156 B2
(45) Date of Patent: Dec. 3, 2013

(54) ONE-WAY CLUTCH

(75) Inventors: Minoru Araki, Yokohama (JP); Naoto Jimbo, Yokohama (JP)

(73) Assignee: Nifco Inc., Yokohama (JP)

( * ) Notice: Subject to any disclaimer, the term of this patent is extended or adjusted under 35 U.S.C. 154(b) by 0 days.

(21) Appl. No.: 13/643,885

(22) PCT Filed: Apr. 22, 2011

(86) PCT No.: PCT/JP2011/002355
§ 371 (c)(1),
(2), (4) Date: Nov. 1, 2012

(87) PCT Pub. No.: WO2011/135812
PCT Pub. Date: Nov. 3, 2011

(65) Prior Publication Data
US 2013/0068581 A1  Mar. 21, 2013

(30) Foreign Application Priority Data

Apr. 27, 2010 (JP) .................................. 2010-102162

(51) Int. Cl.
*F16H 57/08* (2006.01)
(52) U.S. Cl.
USPC ........................................................ 475/331
(58) Field of Classification Search
USPC ............. 475/331, 343, 334, 346; 192/45.002, 192/45.001, 41 R, 31, 30 R, 12 B, 12 R
See application file for complete search history.

(56) References Cited

U.S. PATENT DOCUMENTS

| 6,095,693 A * | 8/2000 | Fujiwara ...................... 384/625 |
| 2004/0112703 A1* | 6/2004 | Kremer ............................ 192/46 |
| 2005/0130794 A1* | 6/2005 | Jinbo ............................. 475/331 |
| 2009/0194385 A1* | 8/2009 | Cao et al. .................... 192/12 B |

FOREIGN PATENT DOCUMENTS

| JP | 2525010 Y2 | 11/1996 |
| JP | 2004-019757 A | 1/2004 |
| JP | 2005-172199 A | 6/2005 |
| JP | 2010-106985 A | 5/2010 |

OTHER PUBLICATIONS

WIPO, "International Search Report for PCT/JP2011/002355", Aug. 2, 2011.

* cited by examiner

*Primary Examiner* — David D Le
*Assistant Examiner* — David J Hlavka
(74) *Attorney, Agent, or Firm* — Manabu Kanesaka

(57) ABSTRACT

A one-way clutch of an inscribed gear type has a cylindrical outer member having an inner gear at an inner circumference thereof; an inner member rotatably disposed in an inside space of the inner gear, and having gear receivers and a lock edge on one side in a circumferential direction of the gear receiver; and a planetary gear received rollably in each of the gear receivers to mesh with the inner gear. Shafts are projecting from both ends of the planetary gear, and bearing recesses are formed on the gear receiver to receive the shaft. By the engagement between the shafts and the bearing recesses, the planetary gear allows a circumferential displacement within a predetermined range with respect to the inner member required for engaging to or disengaging from the lock edge, and the planetary gear is prohibited from being displaced inward in a radial direction of the inner member.

3 Claims, 5 Drawing Sheets

ONE-WAY CLUTCH

TECHNICAL FIELD

The present invention relates to a one-way clutch and, more particularly, to a one-way clutch of an inscribed gear type.

BACKGROUND ART

As a one-way clutch for use in a sheet feeding mechanism for a facsimile, a copying machine, or the like, a one-way clutch of an inscribed gear type, is known, including a cylindrical outer member having an inner gear at its inner circumference; an inner member rotatably disposed in an inside space of the inner gear, having gear receivers at its outer periphery and a lock edge on one side in the circumferential direction of the gear receiver; and a planetary gear received rollably in each of the gear receivers so as to mesh with the inner gear (for example, Patent Document 1).

In a one-way clutch of an inscribed gear type, when an inner member is rotated in one direction with respect to an outer member, a planetary gear is displaced on one side in a circumferential direction inside of a gear receiver according to the rotation, so that a lock edge is fitted to a gear root of the planetary gear, thereby disenabling the planetary gear from rolling so as to connect the outer member and the inner member in a torque transmission relationship. To the contrary, when the inner member is rotated in the other direction with respect to the outer member, the planetary gear is displaced on the other side in the circumferential direction inside of the gear receiver according to the rotation, so that the lock edge is released (separated) from the gear root of the planetary gear, thereby enabling the planetary gear to roll so as to allow the outer member and the inner member to be rotated relatively to each other and break off the torque transmission relationship therebetween.

In the above-described one-way clutch of an inscribed gear type, the planetary gear rolls in the state in which its tip contacts with the inner circumferential surface of the gear receiver as if a polygonal member having the same number of vertexes as that of teeth of the planetary gear rolling inside of the gear receiver, thereby intermittently producing a chattering slide noise so as to inhibit silence.

In view of the above, there has been proposed a one-way clutch of an inscribed gear type including movement range regulating means for substantially prohibiting any radial displacement of a planetary gear, in which shafts project from both ends of the planetary gear, holes elongated in a circumferential direction are formed on both axial sides of a gear receiver, wherein the shafts of the planetary gear are fitted to the elongated holes, so that the planetary gear can be displaced in the circumferential direction with respect to an inner member but the tip of the planetary gear cannot contact with the inner circumferential surface of the gear receiver so as to allow the planetary gear to be fitted to or released from a lock edge (for example, Patent Document 2).

PRIOR ART DOCUMENTS

Patent Documents

Patent Document 1: Japanese Patent Application Publication No. 2004-19757
Patent Document 2: Japanese Patent Application Publication No. 2005-172199

SUMMARY OF THE INVENTION

Problem to be Solved by the Invention

In the movement range regulating means for the one-way clutch of an inscribed gear type in the prior art, the shafts projecting from both ends of the planetary gear are fitted to the elongated holes formed at both axial sides of the gear receiver, so that the planetary gear is doubly supported. Therefore, in incorporating the planetary gear such that the shafts projecting from both ends of the planetary gear are fitted to the elongated holes formed at both axial sides of each of the gear receivers, at least a wall on either side in the axial direction of the gear receiver, at which the elongated holes are formed, need to be constituted of a member independent of the inner member. As a consequence, the number of constituent parts and the number of incorporating man-hours are increased with a demand for incorporating precision in circumferentially positioning the elongated holes on both sides in the axial direction of the gear receiver.

A problem to be solved by the present invention is to prevent a planetary gear from rolling in the state in which the tip of the planetary gear contacts with the inner circumferential surface of a gear receiver without increasing the number of constituent parts and the number of incorporating man-hours and degrading incorporating precision so as to avoid a slide noise from occurring and secure silence in a one-way clutch of an inscribed gear type.

Means for Solving the Problem

A one-way clutch according to the present invention includes a cylindrical outer member having an inner gear at an inner circumference thereof; an inner member rotatably disposed in an inside space of the inner gear, and having gear receivers opened toward an outer peripheral side and a lock edge on either side in the circumferential direction of the gear receiver; and a planetary gear received rollably in each of the gear receivers to mesh with the inner gear.

When the inner member is rotated in one direction with respect to the outer member, the planetary gear is displaced on one side in the circumferential direction inside of the gear receiver according to the rotation and the lock edge is engaged to a gear root of the planetary gear. Thus, the planetary gear is disabled from rolling to connect the outer member and the inner member in a torque transmission relationship.

To the contrary, when the inner member is rotated the other direction with respect to the outer member, the planetary gear is displaced on the side in the other circumferential direction inside of the gear receiver according to the rotation and the lock edge is released from the gear root of the planetary gear. Thus, the planetary gear is enabled to rotate to allow the outer member and the inner member to be rotated relatively to each other and break off the torque transmission relationship therebetween.

The one-way clutch further includes shafts projecting from both ends in the axial direction of the planetary gear and bearing recesses formed on both end walls in the axial direction of the gear receiver to be released on the outer peripheral side of the inner member to receive the shafts. The fitting between the shafts and the bearing recesses allows a circumferential displacement of the planetary gear within a predetermined range with respect to the inner member, the displacement being required for fitting to or releasing from the lock edge, to prohibit the planetary gear from being displaced inward in the radial direction of the inner member.

With this configuration, the fitting between the shafts and the bearing recesses prohibits the planetary gear from being displaced inward in the radial direction of the inner member thereby securing that the tips of the planetary gear are not contacting with the inner circumferential surface of the gear receiver, so as to avoid any occurrence of a slide noise caused by the rolling in the state in which the tips of the planetary gear are contacting with the inner circumferential surface of the gear receiver. The displacement of the planetary gear outward in the radial direction of the inner member can be restricted by the mesh between the planetary gear and the inner teeth.

Although the bearing recesses formed on both end walls in the axial direction of the gear receiver prohibit the displacement of the planetary gear inward in the radial direction of the inner member due to the fitting to the shafts, they are released toward the outer periphery of the inner member, so that the shafts disposed at both axial ends of the planetary gear can be fitted to the bearing recesses from the outer periphery of the inner member. In this manner, it is unnecessary to constitute the wall on either side in the axial direction of the gear receiver independently of the inner member, thus preventing any problems of an increase in the number of component parts or incorporating man-hours and the degradation of incorporating precision.

In a one-way clutch according to the present invention, it is preferable that the tip surfaces of the shafts at both ends in the axial direction of the planetary gear should abut against the axial ends of the bearing recess, so as to restrict the axial movement of the planetary gear with respect to the inner member.

With this configuration, the planetary gear can be born in a thrust direction by fitting between the bearing recesses and the shafts, thereby avoiding any abutment of the tooth ends of the planetary gear against the axial side walls of the gear receiver, so as to avoid any occurrence of a slide noise caused by the abutment.

In a one-way clutch according to the present invention, it is preferable that the plurality of gear receivers for the planetary gears should be disposed at positions deviated from each other in the axial direction of the inner member.

With this configuration, the plurality of gear receivers are deviated from each other in the axial direction of the inner member, and therefore, the radial depth of the gear receivers can be increased more than the radius of the inner member without any interference of the gear receivers with each other. Consequently, the outer diameter of the one-way clutch can be reduced without reducing the diameter of the planetary gear.

Effects of the Invention

In the one-way clutch according to the present invention, the fitting between the shafts and the bearing recesses prohibits the planetary gear from being displaced inwardly in the radial direction of the inner member, thereby guaranteeing that the tips of the planetary gear does not contact with the inner circumferential surface of the gear receiver, so as to avoid any occurrence of a slide noise caused by the rolling in the state in which the tips of the planetary gear contact with the inner circumferential surface of the gear receiver. In addition, although the bearing recesses formed on both end walls in the axial direction of the gear receiver prohibit the displacement of the planetary gear inward in the radial direction of the inner member due to the engaging to the shafts, they are released toward the outer periphery of the inner member, so that the shafts disposed at both axial ends of the planetary gear can be fitted to the bearing recesses from the outer periphery of the inner member. In this manner, it is unnecessary to constitute the wall on either side in the axial direction of the gear receiver independently of the inner member, thus preventing any problems of an increase in the number of component parts or incorporating man-hours and the degradation of incorporating precision.

MODES FOR CARRYING OUT OF THE INVENTION

One preferred embodiment of a one-way clutch according to the present invention will be explained with reference to FIGS. 1 to 4.

A one-way clutch includes a cylindrical outer member 10 constituting a clutch case. A cylindrical rubber member or the like of a feed roller, not shown, is fixed to an outer periphery 12 of the outer member 10. At the inner circumferential surface of the outer member 10 is formed a series of inner teeth (i.e., an inner gear) 14 in an inner circumferential direction.

Figure 1:
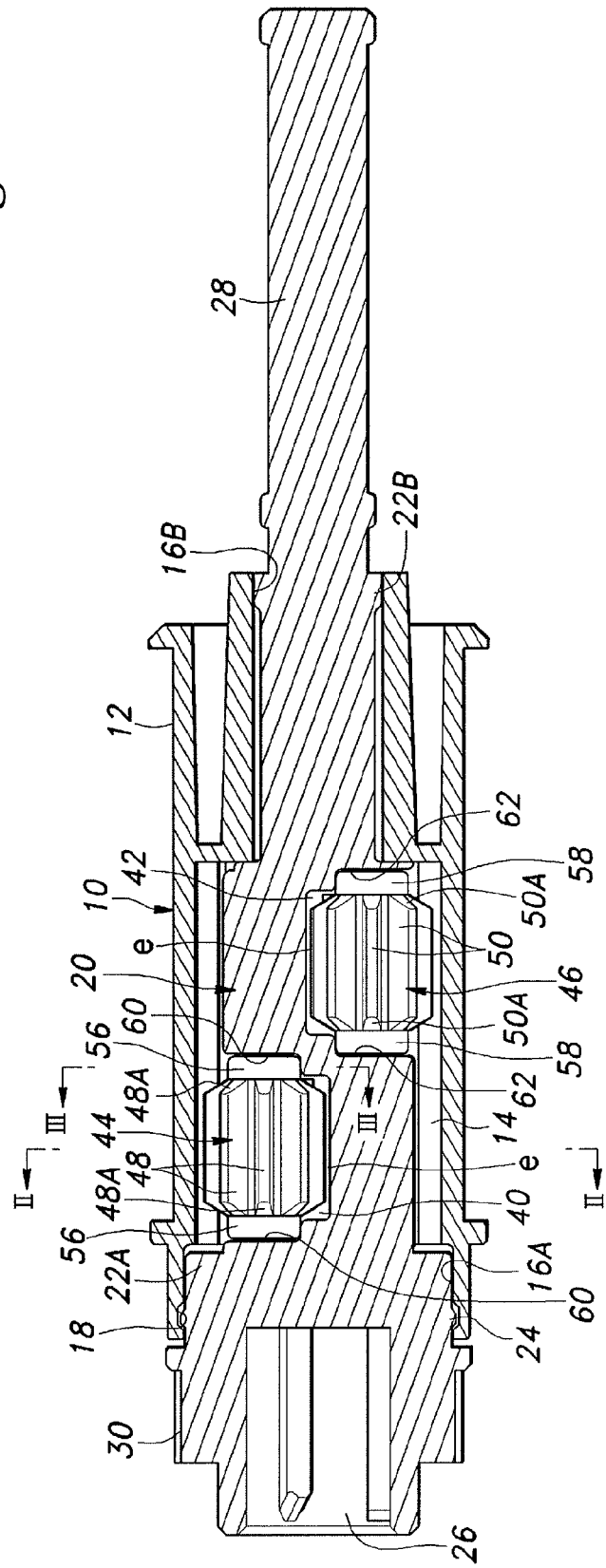
FIG. 1 is a longitudinal cross-sectional view showing one preferred embodiment of a one-way clutch according to the present invention.

In the cylindrical inside space of the outer member 10, that is, an inside space of the inner gear, an inner member 20 having a substantially columnar shape penetrates in an axial direction (i.e., in a lateral direction in FIG. 1). Bearing outer peripheral portions 22A and 22B disposed at two portions apart from each other in the axial direction are slidably fitted to bearing inner circumferential portions 16A and 16B of the outer member 10 in a rotational direction, so that the inner member 20 is rotatably supported by the outer member 10 in a coaxial manner. An annular projection 24 is formed at the outer peripheral surface of the inner member 20 whereas an annular recessed groove 18 is formed at the inner circumferential surface of the outer member 10. The annular projection 24 and the annular recessed groove 18 are fitted to each other, thus incorporating (i.e., stopping) the outer member 10 and the inner member 20 in the axial direction.

In the inner member 20, portions projecting outwardly of the axial ends of the outer member 10 serve as bearings 26 and 28 that are rotatably supported on their own center axes via outside bearings, not shown. A driving outer gear 30 is formed at the outer peripheral portion in the inner member 20 and outward of the axial ends of the outer member 10.

The inner member 20 includes a plurality of gear receivers, two in the present preferred embodiment, 40 and 42. Each of the gear receivers 40 and 42 is formed into a cavity obtained by engraving a part of the outer peripheral portion of the inner member 20 into a pocket-like shape, and is opened onto the outer peripheral side of the inner member 20. The gear receivers 40 and 42 are deviated from each other in the axial direction of the inner member 20, and further, are formed at positions symmetric with respect to a point along the center axis of the inner member 20, as viewed on an axial projection plane of the inner member 20. That is to say, the gear receivers 40 and 42 are located at positions rotationally displaced at 180° from each other on the center axis of the inner member 20.

Figure 2:
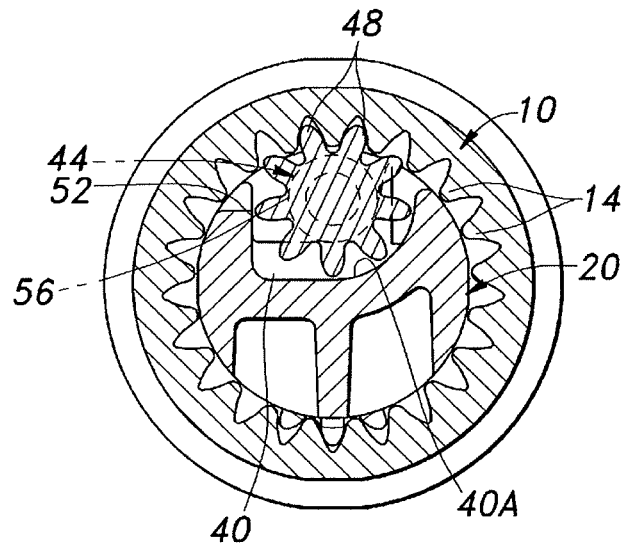
FIG. 2 is an enlarged cross-sectional view taken along a line II-II of FIG. 1.
Figure 3:
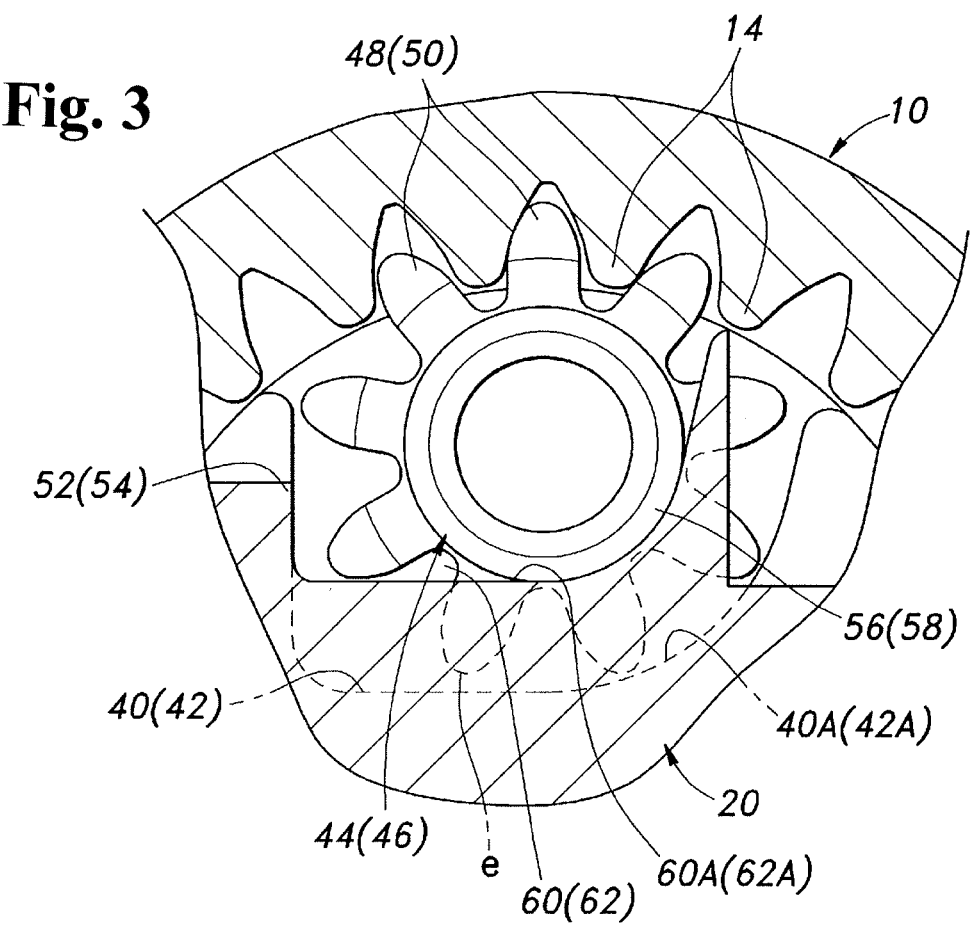
FIG. 3 is an enlarged cross-sectional view showing essential parts of the one-way clutch in the present preferred embodiment (corresponding to a cross-sectional view taken along a line III-III of FIG. 1).
Figure 4:
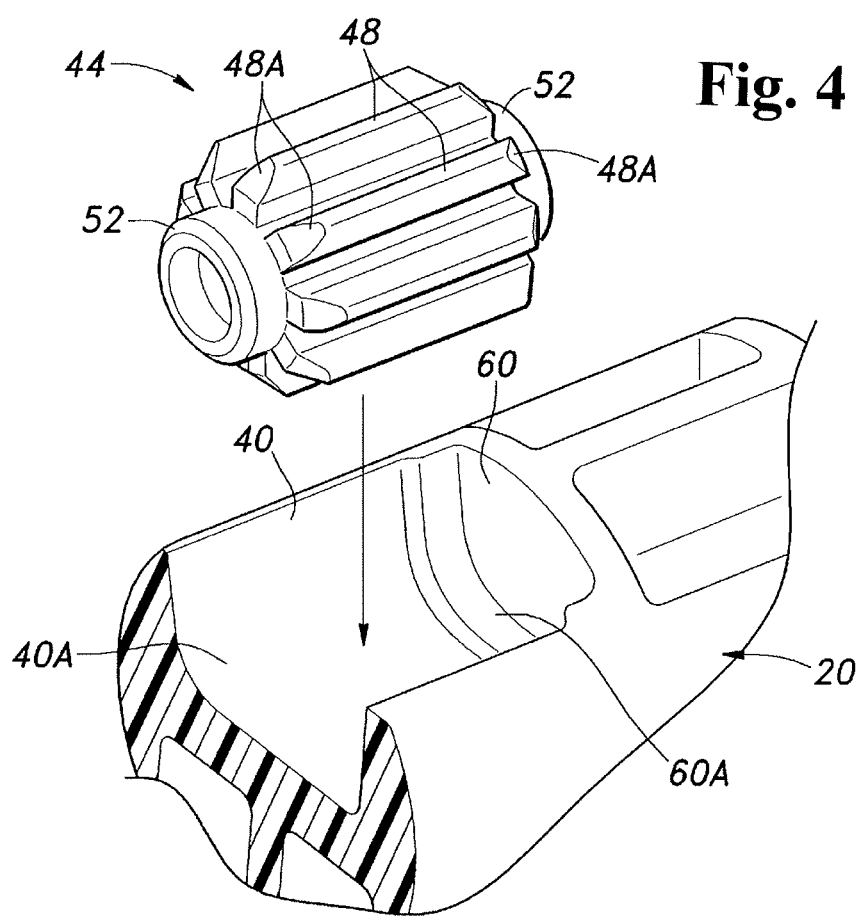
FIG. 4 is an exploded perspective view showing the essential parts of the one-way clutch in the present preferred embodiment.

In the inner member 20, square-cornered lock edges 52 and 54 are formed at edges on one side in the circumferential direction of the gear receivers 40 and 42, that is, at edges on a counterclockwise rotational advance side of the inner member 20 in FIGS. 2 and 3 in the present preferred embodiment.

The gear receivers 40 and 42 respectively receive rollably therein planetary gears 44 and 46 having a series of outer teeth 48 and 50 at the outer peripheral surfaces, and further, in a displaceable manner by only predetermined amount in the circumferential direction of the inner member 20. The respective outer teeth 48 and 50 of the planetary gears 44 and 46 mesh with the inner teeth 14 of the outer member 10.

When the inner member 20 is rotated in one direction with respect to the outer member 10 (i.e., counterclockwise in FIGS. 2 and 3), the planetary gears 44 and 46 are displaced inside of the gear receivers 40 and 42 in one direction in the circumferential direction (in a counterclockwise advance direction, as viewed in FIGS. 2 and 3) according to the rotation of the inner member 20, so that the lock edges 52 and 54 are fitted to the tooth roots of the planetary gears 44 and 46, respectively. This fitting disenables the planetary gears 44 and 46 to roll with the outer teeth 48 and 50 meshing with the inner teeth 14, and therefore, the outer member 10 and the inner member 20 are connected to each other in a torque transmission relationship, and thus, are integrally rotated in the same rotational direction (i.e., counterclockwise in FIGS. 2 and 3).

To the contrary, when the inner member 20 is rotated in the other direction with respect to the outer member 10 (clockwise in FIGS. 2 and 3), the planetary gears 44 and 46 are displaced inside of the gear receivers 40 and 42 in the other direction in the circumferential direction (in a clockwise advance direction, as viewed in FIGS. 2 and 3), so that the lock edges 52 and 54 are released from the tooth roots of the planetary gears 44 and 46, respectively. This release enables the planetary gears 44 and 46 to roll with the outer teeth 48 and 50 meshing with the inner teeth 14, and therefore, the outer member 10 and the inner member 20 are allowed to be rotated relatively to each other, so that they are released from the torque transmission relationship. In other words, the inner member 20 can be freely rotated counterclockwise in FIGS. 2 and 3 with respect to the outer member 10 in the released state.

Shafts 56 and 58 project from both ends of the planetary gears 44 and 46 in the axial direction (i.e., in the lateral direction in FIG. 1). Bearing recesses 60 and 62 are formed and released on the outer peripheral side of the inner member 20 on both end walls of the gear receivers 40 and 42 in the axial direction (i.e., in the lateral direction in FIG. 1), so as to receive the shafts 56 and 58, respectively.

To the bearing recesses 60 and 62 are fitted the shafts 56 and 58 of the planetary gears 44 and 46, respectively. With this fitting, the planetary gears 44 and 46 are doubly supported at bottoms (i.e., inner circumferential surfaces) 60A and 62A of the bearing recesses 60 and 62 on the shafts 56 and 58 at both ends in the axial direction. Thus, the movement (i.e., the degree of freedom) of the planetary gears 44 and 46 inside of the gear receivers 40 and 42 are regulated by the shapes of the bearing recesses 60 and 62 (i.e., a lateral cross-sectional shape perpendicular to the axis of the inner member 20).

In the bearing recesses 60 and 62, the shafts 56 and 58 abut against the bottom 60A and 62A of the bearing recesses 60 and 62 in the mode in which the planetary gears 44 and 46 allow a circumferential displacement within a predetermined range with respect to the inner member 10 required for fitting to or releasing from the lock edges 52 and 54, thereby prohibiting the planetary gears 44 and 46 from being displaced inward in the radial direction of the inner member 20. The respective bottoms 60A and 62A of the bearing recesses 60 and 62 are formed into a shape having a linearly flat portion at which the planetary gears 44 and 46 are circumferentially displaced within the predetermined range with respect to the inner member 10 for fitting to or releasing from the lock edges 52 and 54 and an arcuate portion formed on a side on which the planetary gears 44 and 46 are released from the lock edges 52 and 54, as well shown in FIG. 3, thereby retaining the shafts 56 and 58 in a freely rotating (rolling) manner.

Incidentally, although the respective bottoms (the inner circumferential surfaces) 60A and 62A of the bearing recesses 60 and 62 and the respective bottoms 40A and 42A of the gear receivers 40 and 42 are similar in shape to each other in the preferred embodiment shown in the drawings, the shape of each of the bottoms (the inner circumferential surfaces) 60A and 62A of the bearing recesses 60 and 62 cannot regulate the movement of the planetary gears 44 and 46 inside of the gear receivers 40 and 42, and therefore, it may be freely set.

As described above, the fitting between the shafts 56 and 58 and the bearing recesses 60 and 62 can prohibit the planetary gears 44 and 46 from being displaced inward in the radial direction of the inner member 20 in the mode in which the planetary gears 44 and 46 allow the circumferential displacement required for the fitting to or releasing from the lock edges 52 and 54 within the predetermined range with respect to the inner member 10. The outward displacement of the planetary gears 44 and 46 in the radial direction of the inner member 20 can be restricted by the mesh between the outer teeth 48 and 50 of the planetary gears 44 and 46 and the inner teeth 14 of the outer member 10.

In this manner, with some assurances of the proper mesh between the outer teeth 48 and 50 of the planetary gears 44 and 46 and the inner teeth 14 of the outer member 10, each of the component parts is dimensionally set, thereby securing clearances e between the tips of the planetary gears 44 and 46 and the bottoms 60A and 62A of the gear receivers 40 and 42, so as to assure no contact of the tips of the planetary gears 44 and 46 with the bottoms 60A and 62A of the gear receivers 40 and 42. As a consequence, the planetary gears 44 and 46 cannot roll in the state in which the tips of the planetary gears 44 and 46 contacts with the bottoms 60A and 62A of the gear receivers 40 and 42, thus securely avoiding the occurrence of a slide noise caused by the rolling.

The bearing recesses 60 and 62 formed on both end walls in the axial direction of the gear receivers 40 and 42 prohibit the planetary gears 44 and 46 from being displaced inward in the radial direction of the inner member 20 due to the fitting to the shafts 56 and 58. However, the bearing recesses 60 and 62 are formed into the shape released toward the outer periphery of the inner member 20, and therefore, both of the shafts 56 and 58 disposed at both ends in the axial direction of the planetary gears 44 and 46 can be fitted to the bearing recesses 60 and 62 from the outer peripheral side of the inner member 20. In this manner, the walls on either side in the axial direction of the gear receivers 40 and 42 need not be constituted of a member independent of the inner member 20, thus raising no problem of an increase in the number of component parts or incorporating man-hours and degradation of the incorporating precision.

Moreover, in the present preferred embodiment, both axial ends of the outer teeth 48 and 50 of the planetary gears 44 and 46 are formed into chamfered shapes 48A and 50A. Consequently, the axial ends of the outer teeth 48 and 50 and the axial ends of the gear receivers 40 and 42 cannot slide contact with each other, thus preventing any occurrence of a slide noise at these portions.

The two gear receivers 40 and 42 for receiving the planetary gears 44 and 46 therein are deviated from each other in the axial direction of the inner member 20 and the adjacent gear receivers 40 and 42 do not overlap each other, as viewed in the axial direction of the inner member 20 in the above-described preferred embodiment. As a consequence, although the one-way clutch becomes long in the axial direction, the outer diameter of the one-way clutch can be reduced without reducing the diameter of each of the planetary gears 44 and 46.

Here, although the number of gear receivers disposed in the inner member 20 is set to two in the above-described preferred embodiment, the number of gear receivers is not limited to two. It may be three, four, or more, as required.

Figure 5:
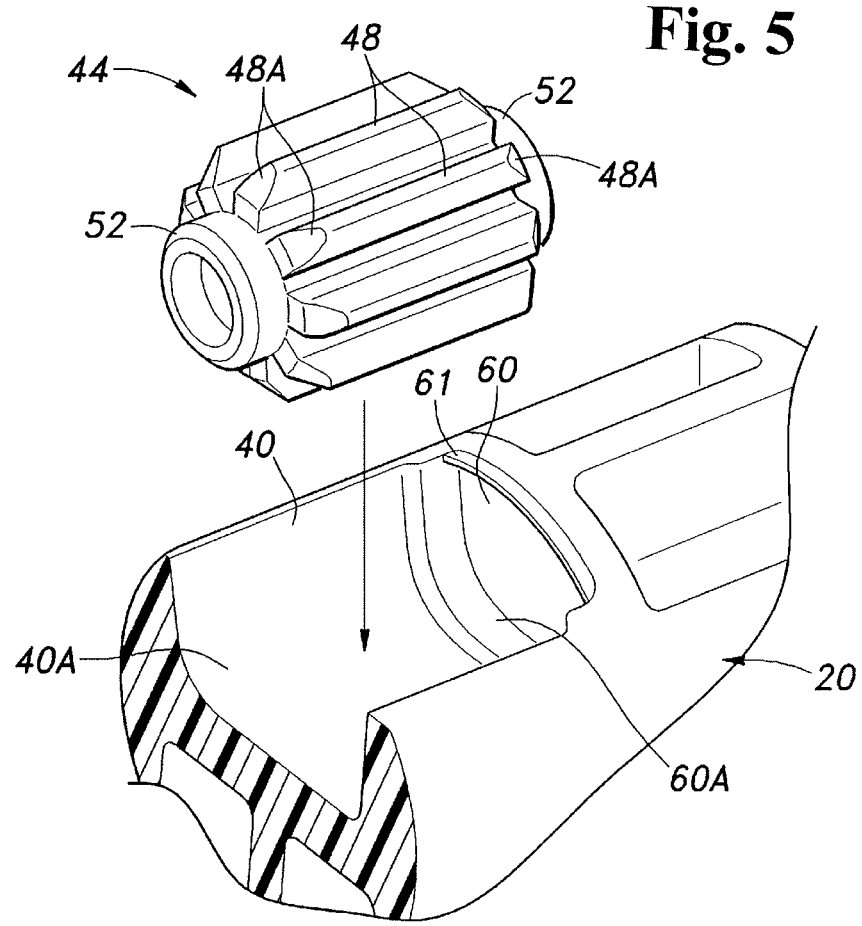
FIG. 5 is an exploded perspective view showing essential parts of another preferred embodiment of the one-way clutch according to the present invention.

The bearing recesses 60 and 62 may be formed into any shapes as long as the shafts 56 and 58 of the planetary gears 44 and 46 can be fitted into the bearing recesses 60 and 62 from the outer peripheral side of the inner member 20. As shown in FIG. 5, a stopping protrusion 61 may be formed at an opening edge with respect to the outer peripheral surface of the inner member 20. In this case, the shafts 56 and 58 come to be fitted into the bearing recesses 60 and 62 over the protrusion 61 from the outer peripheral side of the inner member 20.

Figure 6:
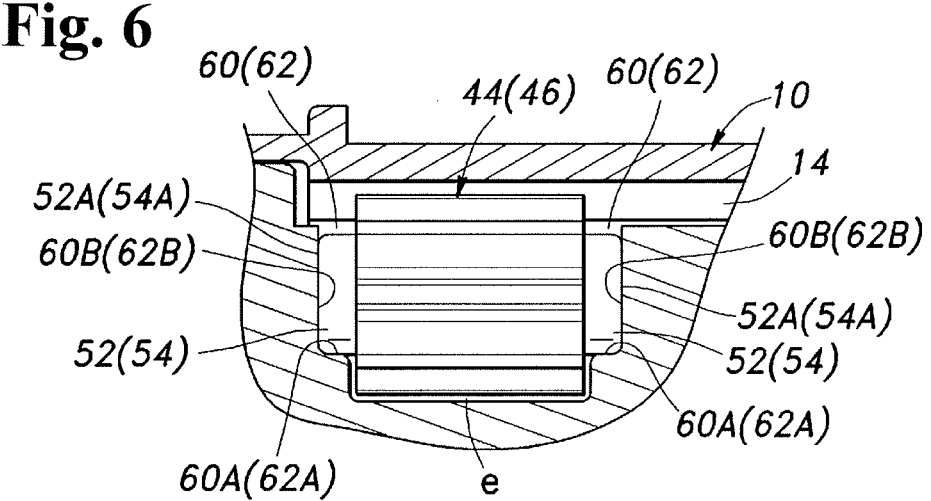
FIG. 6 is an enlarged, longitudinal cross-sectional view showing essential parts of the another preferred embodiment of the one-way clutch according to the present invention.

Another preferred embodiment of the one-way clutch according to the present invention will be described with reference to FIG. 6. In FIG. 6, component parts corresponding to those shown in FIG. 1 are designated by the same reference numerals as those in FIG. 1, and therefore, their explanation will be omitted below.

Like the above-described preferred embodiment, in the present preferred embodiment, the fitting between shafts 56 and 58 and bearing recesses 60 and 62 can prohibit planetary gears 44 and 46 from being displaced inward in the radial direction of an inner member 20 in the mode in which the planetary gears 44 and 46 allow the circumferential displacement required for the fitting to or releasing from lock edges 52 and 54 within a predetermined range with respect to the inner member 10. In addition, tip surfaces 52A and 54A of the shafts 56 and 58 at both ends in the axial direction of the planetary gears 44 and 46 abut against axial ends 60B and 62B of the bearing recesses 60 and 62, thereby restricting the axial movement of the planetary gears 44 and 46 with respect to the inner member 20.

In this manner, the planetary gears 44 and 46 are born in a thrust direction, thus avoiding the tooth ends of the planetary gears 44 and 46 from abutting against the axial side walls of gear receivers 40 and 42, so as to avoid any occurrence of a slide noise caused by the abutment. In this case, both axial ends of outer teeth 48 and 50 of the planetary gears 44 and 46 need not always be formed into chamfered shapes 48A and 50A.

Furthermore, the tip surfaces 52A and 54A of the shafts 56 and 58 at both ends in the axial direction of the planetary gears 44 and 46 abut against the axial ends 60B and 62B of the bearing recesses 60 and 62, thereby regulating the fixing attitude of the planetary gears 44 and 46 with respect to the inner member 20, so as to prevent the center axes of the planetary gears 44 and 46 from being inclined with respect to the center axis of the inner member 20. Consequently, the outer teeth 48 and 50 of the planetary gears 44 and 46 can mesh with inner teeth 14 with certainty, so that the outer teeth 48 and 50 of the planetary gears 44 and 46 can be excellently kept meshing with the inner teeth 14.

Figure 7:
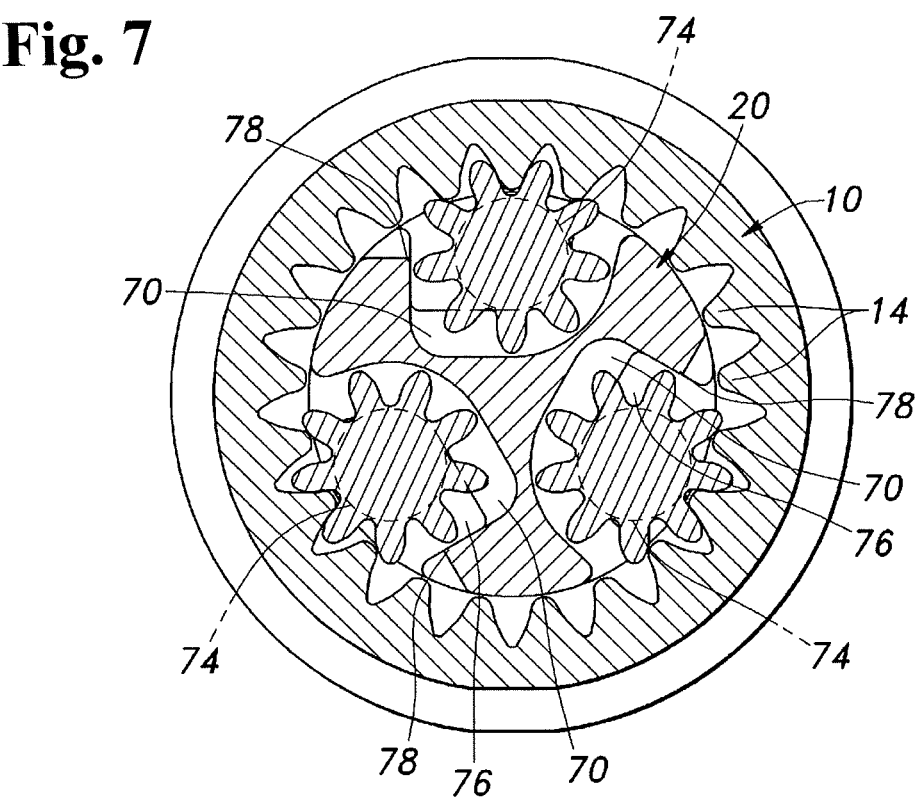
FIG. 7 is an enlarged, lateral cross-sectional view showing essential parts of the another preferred embodiment of the one-way clutch according to the present invention.

Additionally, in the case where it is unnecessary to reduce the outer diameter of the one-way clutch, planetary gears 72 received in gear receivers 70, respectively, may be arranged coaxially with an inner member 20, as shown in FIG. 7.

Also in this preferred embodiment, the fitting between shafts 74 at both axial ends of the planetary gears 72 and bearing recesses 76 formed on both axial end walls of the gear receivers 70 can prohibit the planetary gears 72 from being displaced inward in the radial direction of the inner member 20 in the mode in which the planetary gears 72 allow the circumferential displacement required for the fitting to or releasing from lock edges 78 within a predetermined range with respect to the inner member 10, like in the above-described preferred embodiments. Consequently, the same effects as those produced in the above-described preferred embodiments can be produced.

Although the present invention has been described by way of the preferred embodiments, it is not limited to the preferred embodiments as one skilled in the art can readily understand, and therefore, it can be appropriately changed within a range not departing from the scope of the present invention.

All of the disclosures of the Japanese Patent Application (Patent Application No. 2010-102162 filed on Apr. 27, 2010), which the present application claims the Convention priority based on, are incorporated in the specification of the present application by reference herein. All of the contents of the application, which the present application claims the Convention priority based on, and all of the contents of the prior art cited here in the present application constitute the specification of the present application by referring to them.

REFERENCE NUMERALS IN THE DRAWINGS 10 outer member
14 inner teeth
12 end wall
16, 18 annular recessed groove
20 inner member
22 arcuate guide projection
24 semi-circular flange
26 end member
28 circular flange
30 semi-circular flange
32 outside connector
34 annular guide projection
40, 42 gear receiver
44, 46 planetary gear
48, 50 outer teeth
52, 54 lock edge
56, 58 shaft
60, 62 bearing recess

What is claimed is:
1. A one-way clutch of an inscribed gear type comprising:
a cylindrical outer member having an inner gear at an inner circumference thereof;

an inner member rotatably disposed in an inside space of the inner gear, and having gear receivers opened toward an outer peripheral side and a lock edge on one side in a circumferential direction of the gear receiver; and a planetary gear received rollably in each of the gear receivers to mesh with the inner gear;

wherein when the inner member is rotated in one direction with respect to the outer member, the planetary gear is displaced on one side in the circumferential direction inside of the gear receiver according to the rotation to engage a gear root of the planetary gear to the lock edge, and by the engagement, the planetary gear is disabled from rolling to connect the outer member and the inner member in a torque transmission relationship, when the inner member is rotated in the other direction with respect to the outer member, the planetary gear is displaced on the side in the other circumferential direction inside of the gear receiver according to the rotation to release the engagement of the lock edge and the gear root of the planetary gear, and the planetary gear is enabled to roll to allow the rotation relative to the outer member and the inner member and release the torque transmission relationship therebetween, shafts are projecting from both ends of the planetary gear in an axial direction; and bearing recesses are formed on both end walls in the axial direction of the gear receiver to be released on the outer peripheral side of each of the inner members to receive the shaft, and by the engagement between the shafts and the bearing recesses, the planetary gear allows a circumferential displacement within a predetermined range with respect to the inner member required for engaging to or disengaging from the lock edge, and the planetary gear is prohibited from being displaced inward in a radial direction of the inner member.

2. A one-way clutch according to claim 1, wherein tip surfaces of the shafts at both ends in the axial direction of the planetary gear abut against axial ends of the bearing recess to restrict an axial movement of the planetary gear with respect to the inner member.

3. A one-way clutch according to claim 1, wherein the gear receivers for the planetary gears are disposed at positions deviated from each other in the axial direction of the inner member.

* * * * *